United States Patent [19]

Antognini et al.

[11] Patent Number: 4,467,256

[45] Date of Patent: Aug. 21, 1984

[54] METHOD AND DEVICE FOR CONTROLLING A STEPPING MOTOR OF A TIMEPIECE

[75] Inventors: Luciano Antognini, Champaign, Ill.; Hans-Jürgen Rémus, Neuchatel, Switzerland

[73] Assignee: Asulab S.A., Bienne, Switzerland

[21] Appl. No.: 426,316

[22] Filed: Sep. 29, 1982

[30] Foreign Application Priority Data

Oct. 2, 1981 [CH] Switzerland ........................ 6341/81

[51] Int. Cl.³ ............................................ H02K 29/02

[52] U.S. Cl. .................................... 318/696; 368/157

[58] Field of Search ................ 318/685, 696; 361/160; 368/157

[56] References Cited

U.S. PATENT DOCUMENTS 3,812,413 5/1983 Keidl ................................ 318/696
4,216,648 8/1980 Maire .................................. 368/66

FOREIGN PATENT DOCUMENTS 2944872 3/1981 Fed. Rep. of Germany .
2413633 7/1979 France .
2458939 1/1981 France .
2006995 5/1979 United Kingdom .
2059649 4/1981 United Kingdom .
2061570 5/1981 United Kingdom .
2063529 6/1981 United Kingdom .
2064898 6/1981 United Kingdom .

OTHER PUBLICATIONS

Crider, C. H. & Frankeny, R. F., "Current Tracking Chopper Motor Driver", IBM Technical Disclosure Bulletin, vol. 23, No. 4, Sep. 1980, pp. 1303–1304.

*Primary Examiner*—G. Z. Rubinson
*Assistant Examiner*—Saul M. Bergmann
*Attorney, Agent, or Firm*—Pollock, Vande Sande & Priddy

[57] ABSTRACT

The present invention concerns a method and a device for controlling a stepping motor of a timepiece, which permit the power of each drive pulse to be adapted to the value of the electromotive force (V) and/or the internal resistance (R*) of the power supply source (10).

In accordance with the invention, at a given moment, a value of a chopping rate (Ha) is determined in dependence on the value of the electromotive force V and/or the internal resistance R* of the power supply source (10), said value being stored, and the chopping rate of each control pulse being adjusted to the stored value.

The control device comprises means (13) for supplying a chopping signal (M) to a drive circuit (12) of the motor (11). The chopping rate is determined by information contained in a memory (14). The stored information is periodically corrected in dependence on the value of the electromotive force (V) and/or the internal resistance (R*) of the power supply source (10).

4 Claims, 7 Drawing Figures

METHOD AND DEVICE FOR CONTROLLING A STEPPING MOTOR OF A TIMEPIECE

CROSS-REFERENCE TO RELATED APPLICATION

This application is related to Ser. No. 426,361 filed Sept. 29, 1982 by the same applicants for Method for Reducing the Consumption of a Stepping Motor and Device for Performing the Method.

BACKGROUND OF THE INVENTION

The present invention concerns timepieces having a stepping motor and more particularly a control method and device for applying to the terminals of the winding of the stepping motor, a control signal comprising a series of drive pulses, each of the drive pulses itself being formed by a series of spaced elementary pulses.

The book entitled "Theory and Applications of Step Motors" by Benjamin C. Kuo, West Publishing Co., pages 173 to 180, proposes supplying the winding of a stepping motor, with a control signal of that type. In that prior art document, each of the drive pulses applied to the winding of the motor is cut into elementary pulses in the following manner: the voltage source used for feeding the motor is first connected to the terminals of the winding of the motor. The power supply source is disconnected from the winding and the winding is short-circuited as soon as the current flowing in the winding reaches a first predetermined value. The current in the winding then decreases and, when it reaches a second predetermined value, the power supply source is again connected to the terminals of the winding of the motor, the short-circuited condition of which is eliminated. Such a method permits the current flowing in the motor winding to be maintained at a substantially constant means value.

Nonetheless, if the voltage of the power source varies, the power supplied to the motor varies in the same manner so that the known method does not permit the power supplied to the motor in each drive pulse to be maintained at a constant level, when using a power supply source, the electromotive force and the internal resistance of which vary in the course of time.

British Pat. No. 2,006,995 proposes chopping each drive pulse which is applied to the winding of the motor, using two separate, predetermined values of the chopping rate, the higher value being used only when the motor is to provide an abnormally high force. For that purpose, the above-indicated British patent proposes using a means for detecting the load on the motor.

This known control apparatus also suffers from the disadvantage of not taking into account fluctuations in the voltage supplied by the power source, which are due to variations in the electromotive force and/or internal resistance of the power source.

Now, in electronic timepieces, there is a tendency at the present time to use a lithium-type battery as the electrical power supply source. It is known that the electromotive force produced by such batteries decreases relatively substantially during the service life of the battery, and that the internal resistance of the battery is subject to substantial variations during the life of the battery and under the effect of variations in temperature. The above-mentioned reduction in electromotive force and/or the variations in internal resistance may cause the motor to stop, so that the timepiece no longer works, well before the battery reaches the end of its service life. In order to overcome that disadvantage, the size of the motor must be such that it can continue to operate even when the battery is supplying its lowest level of electromotive force and is at its highest level of internal resistance. This results in over-consumption by the motor throughout the major part of the service life of the battery.

British patent application No. 2,054,916 proposes supplying the winding of a stepping motor with drive pulses which are each formed by a series of elementary pulses, the width of which is determined in dependence on the value of the voltage which is supplied by the power source when the latter is connected to the terminals of resistors of known values. In accordance with that art, substantially every millisecond, the range of values in which the power source voltage falls is determined, and a form of drive signal is selected, in consequence, from five predetermined forms of signal.

That arrangement is therefore concerned with discontinuous adjustment of the level of power of the drive pulses in dependence on the voltage of the electrical power supply source, and the result is substantial variations in the motor torque which may cause steps to be lost. In addition, as the control action is discontinuous, it does not provide for the energy of the drive pulses to be efficiently controlled in dependence on the load to be driven by the motor.

SUMMARY OF THE INVENTION

It is for that reason that the present invention is primarily concerned with proposing a method and a device for controlling a stepping motor of a timepiece, which permits the power of each drive pulse to be simply and substantially continuously adapted to the value of at least one of the two characteristic parameters of the power supply source, that is to say, the value of the electromotive force and/or the value of the internal resistance of the electrical power supply source.

In accordance with the invention, a value of the chopping duty cycle is periodically determined in dependence on the value of at least one of said characteristic parameters. That value is stored and the chopping duty cycle of each drive pulse is regulated to that value. The stepping motor control device according to the invention may comprise means reacting for example to the current i flowing in the winding of the motor, by producing and storing, at a given moment, a value of the chopping duty cycle, which is a decreasing function of $V-R^{*}I_{o}$, wherein V is the electromotive force and $R^{*}$ is the internal resistance of the power supply source, and means for adjusting the chopping rate of the drive pulses supplied to the motor to that value.

Thus, in the control device according to the invention, each drive pulse is a pulse which is chopped in accordance with a chopping duty cycle, the value of which is a continuous function of the characteristic parameters of the battery.

In accordance with an embodiment which is preferred at the present time, a new value in respect of the chopping duty cycle is periodically determined. In response to a periodic re-calibration signal which appears for example every sixteen minutes, the power supply source is connected to the winding of the motor, the current i flowing in the winding is measured and, as soon as it reaches a first predetermined value iM, the motor is put into a first switching status in which the power supply source is disconnected from the terminals of the motor winding, and the winding is short-circuited. The time T1m taken by the current i to reach a second predetermined value im which is lower than the first value iM is measured and stored. When the current i reaches the value im, the motor is put into a second switching status in which the short-circuiting of the winding is suppressed and the power supply source is again connected to the terminals of the winding. The time T2m taken by the current i to regain the first predetermined value is also measured and stored.

Subsequently in that drive pulse and in the drive pulses following it, the value T2 of the duration of each elementary pulse is adjusted to the value T2m and the value T1 of the duration of the spaces between said elementary pulses is adjusted to the value T1m.

It will be shown hereinafter that the chopping duty cycle T2/(T1+T2) which is determined in the above-described manner is substantially equal to RIo/(V-R*Io), wherein V is the electromotive force of the supply voltage source, R is the resistance of the motor winding, R* is the internal resistance of the power supply source and $I_o$ is a predetermined parameter which is equal to (iM+im)/2. Selection of the predetermined values iM and im will be described hereinafter.

BRIEF DESCRIPTION OF THE DRAWINGS

The features and advantages of the present invention will be better appreciated from the following description of an embodiment of the invention, with reference to the accompanying drawings in which.

DESCRIPTION OF THE PREFERRED EMBODIMENTS

Figure 1:
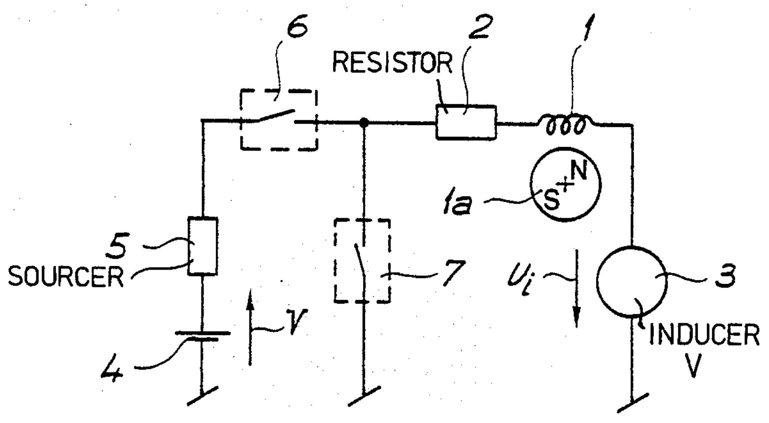
FIG. 1 is an equivalent electrical diagram of a stepping motor.

FIG. 1 shows the equivalent circuit diagram of a stepping motor. The winding of the motor is diagrammatically indicated by a winding 1 having an inductance of value L and a resistance zero, and a resistor 2 providing a resistance R which is equal to the resistance of the winding of the motor. A rotor 1*a* generally comprising a cylindrical bipolar permanent magnet is magnetically coupled to the winding 1, 2 by means of a stator (not shown). The movement-induced voltage, that is to say, the voltage which is induced in the winding of the motor by the rotary movement of the rotor, is diagrammatically indicated in FIG. 1 by a voltage source 3. The value of the induced voltage is designated Ui. FIG. 1 also shows the power supply source of the motor, being diagrammatically indicated by a voltage source 4 which has zero internal resistance and an electromotive force V, and a resistor 5 having a resistance R* equal to the internal resistance of the real source for supplying the motor with power.

In FIG. 1, the motor control circuit is diagrammatically indicated by a first switch 6 for connecting and disconnecting the source 4, 5 and the motor winding, and a second switch 7 for short-circuiting the winding or eliminating the short-circuited condition.

Figure 2:
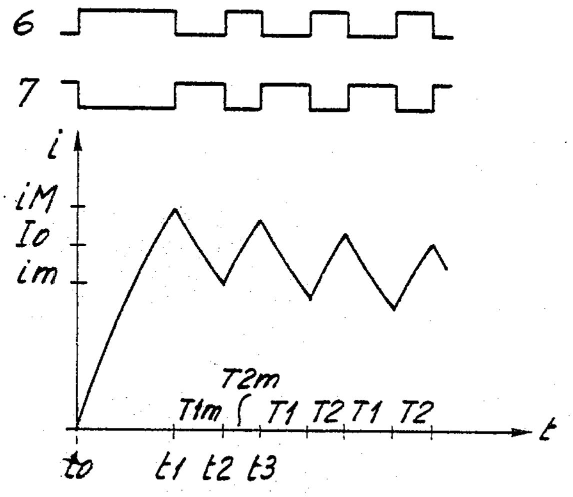
FIG. 2 is a diagram for explaining the method according to the invention.

FIG. 2 illustrates the way in which the rate of chopping of the drive pulses is determined.

At a time to which coincides with the beginning of a drive pulse, the switch 6 is closed and the switch 7 is open. The current i in the winding 1, 2 begins to rise. When, at a time t1, the current reaches a first predetermined value iM, the selection of which will be described hereinafter, the switch 6 is opened and the switch 7 is closed. The winding 1, 2 is therefore disconnected from the power supply source 4, 5 and short-circuited. The current i begins to fall and at a time t2 it reaches a second predetermined value im, the selection of which will also be described hereinafter. The period of time T1m between the times t1 and t2 depends on the electrical and magnetic characteristics of the motor.

At time t2, the switch 6 is re-closed and the switch 7 is re-opened. The short-circuited condition is therefore eliminated and the source 4, 5 is again connected to the winding 1, 2. The current i begins to increase again. At a time t3, it reaches the value iM for the second time. The period of time T2m between the times t2 and t3 depends on the electrical and magnetic characteristics of the motor and the electromotive force V of the supply source 4 and/or the value R* of its internal resistance 5. If the electromotive force V falls and/or if the internal resistance R* rises, the time T2m increases.

The periods of time T1m and T2m are measured and stored. After the time t3 and up to the end of the drive pulse, the switches 6 and 7 are so actuated that the winding is alternately short-circuited and connected to the source 4, 5 for successive periods of durations T1 and T2 which are respectively equal to T1m and T2m. In other words, the drive pulse is chopped at a chopping duty cycle Ha which is defined by: Ha=T2m/(T1m+T2m), and it is composed of a train of elementary pulses having a pulse duty factor equal to Ha.

The first predetermined value iM may be selected fairly freely without that selection substantially influencing the mode of operation of the motor. However, experience has shown that the value iM must be so selected as preferably to be substantially equal to the value of the highest current at which the rotor does not yet rotate. If iM is equal to or less than that value, the chopping duty cycle Ha is independent of the load driven by the motor, which would not be the case if iM were selected to be of a higher value.

The second predetermined value im may also be selected fairly freely. The difference iM-im merely has to be low in relation to iM so that the periods of time T1m and T2m are short with respect to the time constant $\tau=L/R$ of the winding of the motor. It will be shown hereinafter that that condition is necessary in order for the chopping duty cycle, determined in the above-described manner, to depend virtually only on the characteristics of the power supply source.

However, the difference iM-im must not be selected at an excessively low value, so that the periods of time T1m and T2m can be measured with a sufficient degree of accuracy. In practice, the value of im may be selected to fall in a range going from 80 to 90% approximately of the value of iM.

Broadly, the currents and voltages involved in operation of the motor are linked by the following relationship:

$$U_m = R \cdot i + L(di/dt) + U_i \quad (1)$$

in which $U_m$ is the voltage at the terminals of the motor and i is the current flowing in the motor winding.

If the value of the current iM is selected in such a way that the rotor is still not turning at the time t1, the induced voltage $U_i$ is still zero at time T1, and the above equation (1) can be written as follows:

$$U_m = R \cdot i + L(di/dt) \quad (2)$$

Between times t1 and t2, the rotor is still not rotating. The switch 7 is closed and the voltage $U_m$ at the terminals of the motor is therefore zero, provided that the internal resistance of the switch 7 is negligible, which is the case under practical circumstances. Equation (2) above can therefore be written as follows:

$$R \cdot i + L(di/dt) = 0 \quad (3)$$

Between times t2 and t3, the switch 6 is closed but the rotor is still not turning. The voltage $U_m$ is equal to $(V - R^* \cdot i)$. Equation (2) above therefore becomes:

$$V = (R + R^*) \cdot i + L(di/dt) \quad (4)$$

If the value of the current im is so selected as to be sufficiently close to that of the current iM, the periods of time T1m and T2m are short in relation to the time constant $\tau = L/R$ of the motor winding, and it is admissible for the term di/dt to be replaced by a term $(-\Delta i/T1m)$ in equation (3), and by a term $\Delta i/T2m$ in equation (4), with $\Delta = iM - im$ in both cases. It is likewise possible for the term i to be replaced by its mean value Io in the periods of time t1-t2 and t2-t3, the mean value being equal to (iM-im)/2.

Foregoing equations (3) and (4) then respectively become:

$$R \cdot Io - L(\Delta i/T1m) = 0 \quad (5)$$

and $$V = (R + R^*) \cdot Io + L(\Delta i/T2m) \quad (6)$$

Equations (5) and (6) respectively give:

$$T1m = (L \cdot \Delta i)/(R \cdot Io) \quad (7)$$

and $$T2m = (L \cdot \Delta i)/V - (R + R^*) \cdot Io \quad (8)$$

After the time t3, the drive pulse is formed by elementary pulses which have a duration T2 equal to the measured duration T2m, separated by interruption periods or spaces of duration T1 which is equal to the measured duration T1m. The chopping duty cycle Ha in respect of that drive pulse, or the pulse duty factor of the elementary pulses forming the drive pulse, is therefore:

$$Ha = T2m/(T1m + T2m)$$

By replacing T1m and T2m in that equation by the values thereof as given by equations (7) and (8) and after simplification, we have:

$$Ha = RIo/(V - R^* Io) \quad (9)$$

Equation (9) shows that the chopping duty cycle increases when the electromotive force V of the power supply source falls and/or its internal resistance $R^*$ rises, which is the desired aim.

The chopping duty cycle Ha may be determined in the above-described manner, at the beginning of each drive pulse. However, the variations in the electromotive force of the power supply source and/or its internal resistance are generally fairly slow. The operation of determining the chopping duty cycle therefore be performed at longer intervals. In that case, a plurality of successive drive pulses are chopped at the same duty cycle.

Figure 3:
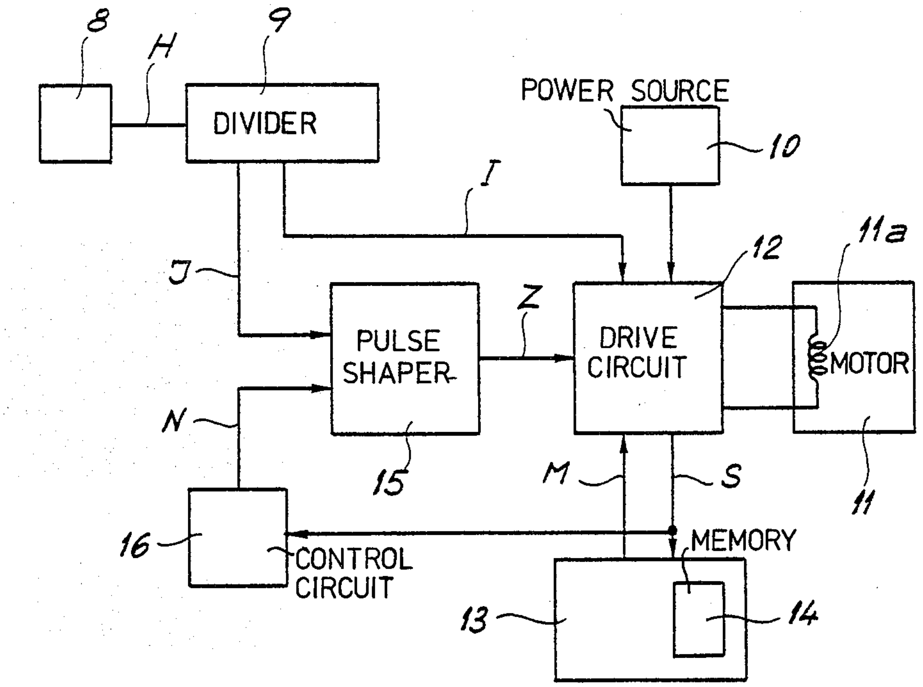
FIG. 3 is a synoptic diagram of a control device in one embodiment of the invention.
Figure 3A:
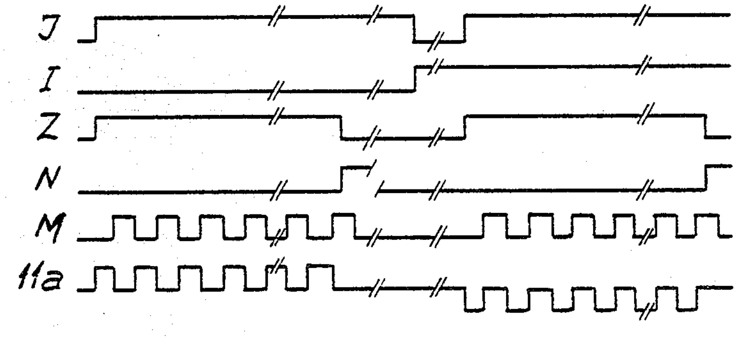
FIG. 3*a* is a diagram representing signals measured at a number of points in the diagram shown in FIG. 3.

FIG. 3 shows by way of example of a device for performing the above-described process, the synoptic circuit diagram of an electronic timepiece comprising a stepping motor 11, while FIG. 3*a* is a diagram showing signals measured at various points in the circuit diagram of FIG. 3. The timepiece comprises an oscillator circuit 8 for generating a time base signal H at a frequency, for example, of 32,768 Hz. The output of the oscillator 8 is connected to the input of a frequency divider circuit 9 which produces various periodic signals, from the time base signal H. The periodic signals comprise in particular a control signal J which appears whenever the rotor is to advance by one step, and a signal I having a period which is double that of the signal J. In general, if the timepiece is provided with a seconds hand, the period of the control signal J is equal to one second.

The timepiece shown in FIG. 3 further comprises a pulse shaper circuit 15 having an output which produces a signal, indicated by Z, formed by a series of pulses of the same polarity, which go to state "1" whenever the signal J itself goes to state "1", that is to say, every second.

The length of the pulses of the signal Z is determined by a control circuit 16 which receives a measuring signal S representing for example the current flowing in the motor. The circuit 16 uses the signal S to supply a signal N at a time which depends on the mechanical load driven by the motor. The circuit 16 will not be described in detail since it may be of a type corresponding to any one of many known such control circuits. Moreover, such a circuit is not essential for carrying out the method according to the invention, and it could be omitted. In that case, the signal N could be replaced by a signal supplied for example by the divider 9. The pulses of the signal Z would then be of a constant and predetermined duration.

Whenever the signal Z is at state "1", a drive circuit 12 supplies a drive pulse to the winding 11*a* of the motor 11. The voltage at the terminals of the motor winding is designated by the same reference 11*a* in FIG. 3*a*. The energy supplied to the motor winding 11*a* during each drive pulse is supplied by a power supply source 10 which, like the source shown in FIG. 1, has an electromotive force of value V and an internal resistance $R^*$.

The polarity of the drive pulses is governed by the logic state of the signal I, which is alternately at state "0" and at state "1" during one second.

The circuit 12 is also so arranged that the drive pulses are chopped in response to a chopping signal M formed by pulses at a high frequency. Whenever the signal M is at state "1", for example, the circuit 12 interrupts the connection between the power supply source 10 and the winding 11*a*, and short-circuits the winding. When the signal M is at state "0", the circuit 12 suppresses the short-circuited condition of the winding 11*a*, and connects the winding to the power supply source 10.

The signal M is supplied by a circuit 13, aninterval therebetween, and therefore the chopping duty cycle Ha, are determined by the circuit 13 from information contained in and memory 14. The circuit 13 further comprises means for periodically correcting such information in dependence on the measuring signal S supplied by the circuit 12.

The periodicity of the correction operation may be equal to or greater than the period of the drive pulses.

Figure 4:
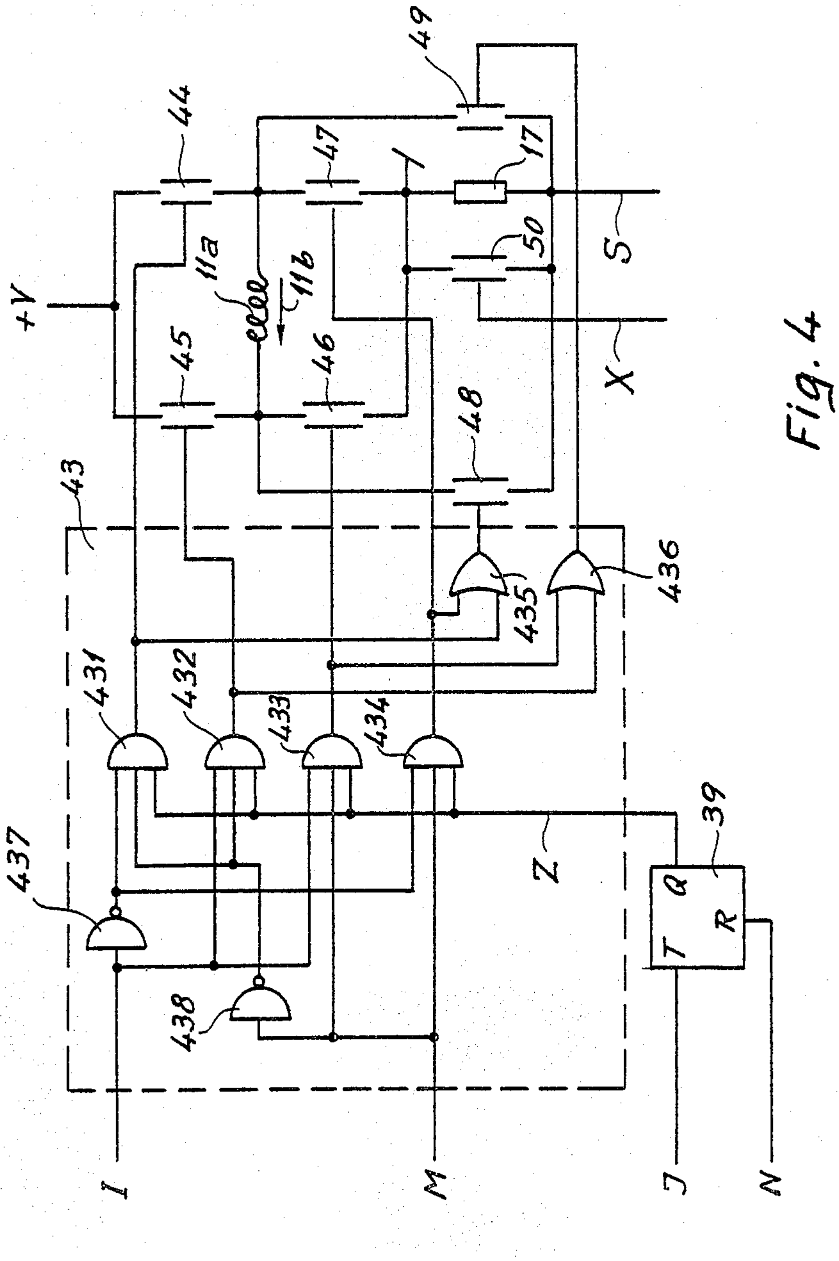
FIG. 4 is a detailed diagram of an example of a part of the device shown in FIG. 3, in one embodiment of the invention.

FIG. 4 shows by way of example, a diagram of the circuits 12 and 15 shown in FIG. 3. In this example, the circuit 15 simply comprises a T-type flip-flop 39, the clock input T of which receives the signal J supplied by the frequency divider 9 shown in FIG. 3, at a frequency of 1 Hz. The reset input R of the flip-flop 39 receives the signal N from the control circuit 16 shown in FIG. 3. The output Q of the flip-flop therefore goes to "1" when the signal J goes to "1", that is to say, each time that the rotor is to move through one step, and goes back to "0" when the circuit 16 produces the signal N at a given time in such a way that the duration of the signal Z which is supplied by the output Q of the flip-flop 39 is equal to the optimum duration of the drive pulse. As already mentioned above, the circuit 16 could be omitted. In that case, the input R of the flip-flop 39 would be connected to an output (not shown) of the divider 9, so selected that the duration of the signal Z is equal for example to 7.8 milliseconds.

In this example, the circuit 12 shown in FIG. 3 comprises a logic circuit 43 formed by four AND-gates 431 to 434, two OR-gates 435 and 436 and two inverters 437 and 438. The winding 11*a* of the motor is connected in conventional manner into a circuit formed by four transmission gates 44 to 47 connected between a terminal +V of the power supply source 10 and earth.

Two other transmission gates 48 and 49 each connect one of the terminals of the winding 11*a* to a first terminal of a measuring resistor 17, the second terminal of which is connected to earth. The voltage at the first terminal of the resistor 17 forms the above-mentioned signal S.

A transmission gate 50 is connected in parallel to the resistor 17. It is controlled by a signal X supplied by the circuit 15 or by the circuit 13, depending on the circumstances. When the circuit shown in FIG. 2 includes the control circuit 16, the signal X may be supplied by the shaper circuit 15 so that the gate 50 is closed during the drive pulses and conducting between drive pulses. The control circuit 16 then uses the signal S to adjust the length of the pulses Z and therefore the length of the drive pulses to the mechanical load driven by the rotor.

When the circuit shown in FIG. 2 does not include the circuit 16, the signal X can be supplied by the circuit 13 in such a way that the gate 50 is closed only when the circuit 13 uses the signal S to modify the information contained in the memory 14, with the gate 50 being in a conducting condition for the rest of the time. That situation will be described in greater detail hereinafter.

The control electrodes of the gates 44 to 49 are connected to the outputs of the logic circuit 43, the inputs of which respectively receive signals I, Z and M. The combination circuit will not be described in greater detail herein, as it is easy to see, by means of FIG. 4*a*, that:

when the signal Z is at state "0", that is to say, between the drive pulses, the control electrodes of the gates 44 and 49 are all at state "0", irrespective of the state of the signals I and M. All those gates are therefore non-conducting and the winding 11*a* is separated from the power supply source;

when the signal Z is at state "1", that is to say, during the drive pulses, and the signal M is at state 0, the gates 44 and 48 or 45 and 49 are in a conducting condition, depending on the state "0" or "1" of the signal I. All the other gates are non-conducting. The power supply source 10 is therefore connected to the winding 11*a* by way of the gates 44 and 48 or 45 and 49, and a current flow in the winding 11*a* in the direction indicated by the arrow 11*b* or in the opposite direction. This situation is therefore the situation which occurs between the interruption periods, during the elementary pulses; and when the signal Z is at state "1" and the signal M is also at state "1", the gates 47 and 48 or 46 and 49 are in a conducting condition, depending on the state "0" or "1" of the signal I. All the other gates are non-conducting. The power supply source is therefore disconnected from the winding 11*a* which is short-circuited. That situation is the one which occurs during the periods of interruption of the drive pulse.

If in addition the gate 50 is closed by the state "0" of the signal X, during a drive pulse, the current which flows in the winding 11*a* also flows in the resistor 17. The voltage produced by that current in the resistor 17 forms the signal S.

It is apparent that the logic circuit 43 could be easily modified so that the gates 44 and 45 for example are both in a conducting condition and the winding is therfore short-circuited between drive pulses. Such an arrangement is often used for rapidly damping oscillations of the rotor about its equilibrium position, at the end of a drive pulse.

Figure 5:
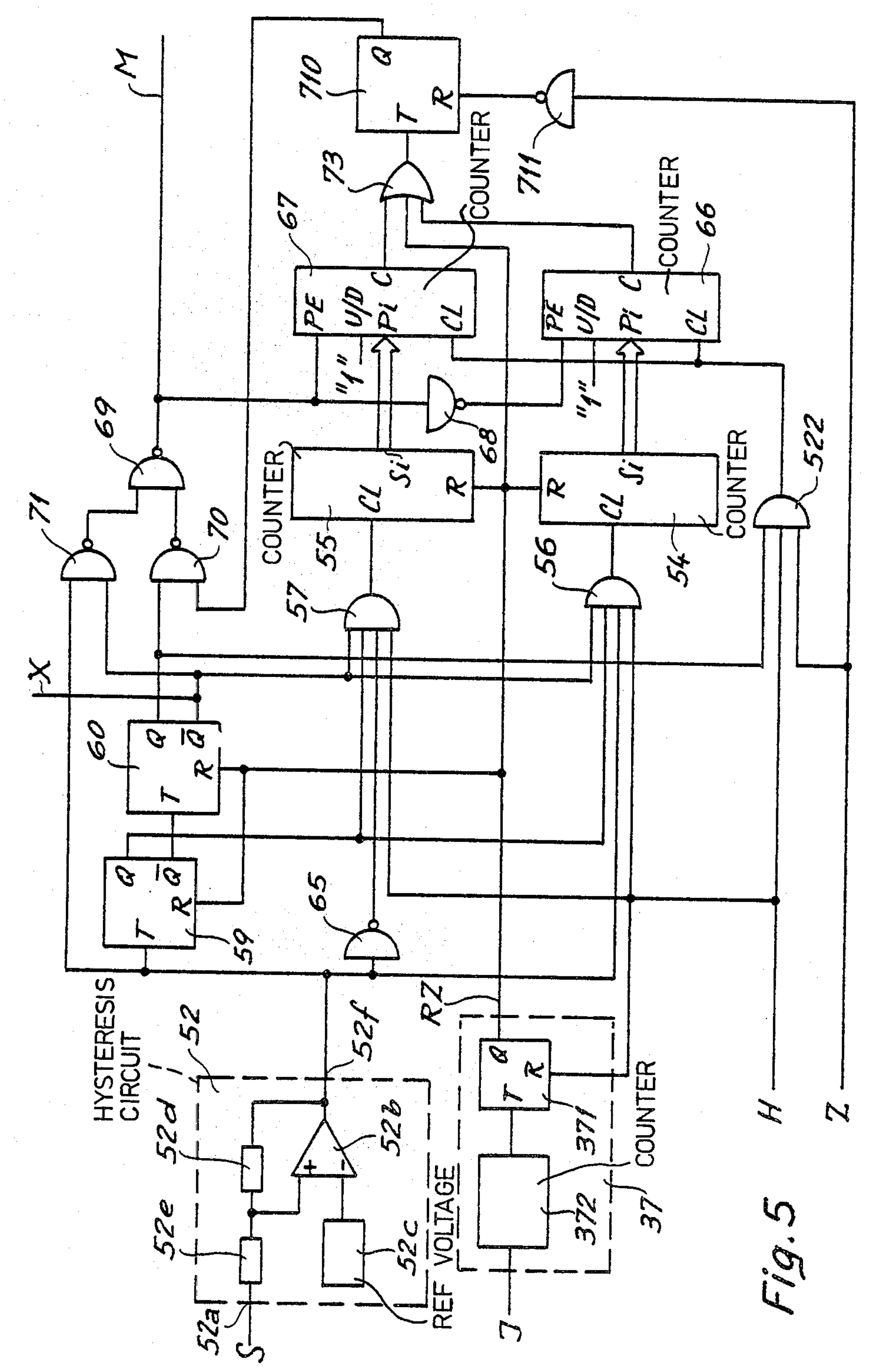
FIG. 5 is a detailed diagram of another part of the device shown in FIG. 3, in an embodiment of the invention.

FIG. 5 shows by way of example the circuit diagram of an embodiment of the circuit 13 shown in FIG. 3.

This circuit comprises two counters 54 and 55 which together form the memory 14 of the circuit shown in FIG. 3. The clock inputs CL of the counters 54 and 55 are respectively connected to the outputs of two AND gates 56 and 57. The gates 56 and 57 each have a first input which receives the signal H from the output of the oscillator 8 (not shown in FIG. 5), a second input connected to the output Q of a T-type flip-flop 59, and a third input connected to the output $\overline{Q}$ of another flip-flop 60 which is also of T-type.

The gates 56 and 57 also each have a fourth input which is connected directly, respectively by way of an inverter 65, to the output 52*f* of a hysteresis circuit which will be described hereinafter. The output 52*f* is also connected to the clock input T of the flip-flop 59 and to a first input of a NAND gate 71, a second input of which is connected to the output $\overline{Q}$ of the flip-flop 60.

The output $\overline{Q}$ of the flip-flop 59 is connected to the clock input T of the flip-flop 60. The output Q of the flip-flop 60 is connected to the first inputs of a NAND gate 70 and an AND gate 522, and to the control input of the transmission gate 50 (see FIG. 4). The output Q of the flip-flop 60 supplies the above-mentioned signal X.

The reset inputs R of the flip-flops 59 and 60 and of the counters 54 and 55 are connected to the output Q of a T-type flip-flop 371 which forms a timer circuit 37 with a counter 372 having a clock input CL for receiving the signal J from the frequency divider 9 (see FIG. 3). The reset input R of the flip-flop 371 and a second input of the gate 522 also receive the signal H.

The outputs of the counters 54 and 55, which are designated together in each counter by the reference Si, are connected to the preselection inputs of two up-down counters 66 and 67, which are designated together by the reference Pi, also in each counter. The inputs for controlling the direction of counting of the counters 66 and 67, as indicated at U/D, permanently receive a logic signal "1" so that the counters permanently operate as down counters. The clock inputs CL of the counters 66 and 67 are connected to the output of the gate 522.

The preselection control input PE of the counter 67 is connected to the output of a NAND gate 69, the inputs of which are respectively connected to the outputs of the gates 70 and 71. The preselection control input PE of the counter 66 is also connected to the output of the gate 69, but by way of an inverter 68.

The counters 66 and 67 each comprise an output C which produces a short pulse at the moment at which their content reaches the value zero. The outputs C are respectively connected to two inputs of an OR gate 73 having a third input connected to the output Q of the flip-flop 371. The output of the gate 73 is connected to the clock input T of a T-type flip-flop 710. The output Q of the flip-flop 710 is connected to a second input of the gate 70 and its reset input R is connected by way of an inverter 711 to the output Q of the flip-flop 39 (see FIG. 4) which produces the signal Z. The signal Z is also applied to a third input of the gate 522.

The output of the gate 69 supplies the chopping control signal M to the drive circuit 12 (see FIGS. 3 and 4).

The hysteresis circuit 52 comprises, in conventional manner, a differential amplifier **52*b*, a reference voltage source 52*c* and a voltage divider formed by two resistors 52*d* and 52*e*. The voltage divider is connected between the input 52*a* of the circuit 52, which receives the signal S from the measuring resistor 17 (see FIG. 4), and the output of the amplifier 52*b* which forms the output 52*f* of the circuit 52. The non-inverting input of the amplifier 52*b* is connected to the junction of the resistors 52*d* and 52*e* and its inverting input is connected to the output of the reference source 52*c***.

The gain of the amplifier **52*b*, the values of the resistors 52*d*, 52*e* and 17, and the value of the reference voltage supplied by the source 52*c* are so selected that when the transmission gate 50 (see FIG. 4) is in a non-conducting condition and the current in the winding 11*a* rises, for example from its zero value, the output 52*f* of the circuit 52 goes to state "1" at the moment at which the current reaches the above-defined value iM and, when the current falls from a value which is higher than or equal to the value iM, the output 52*f* of the circuit 52** returns to state "0" only when the current reaches the value im as also defined above.

Figure 5A:
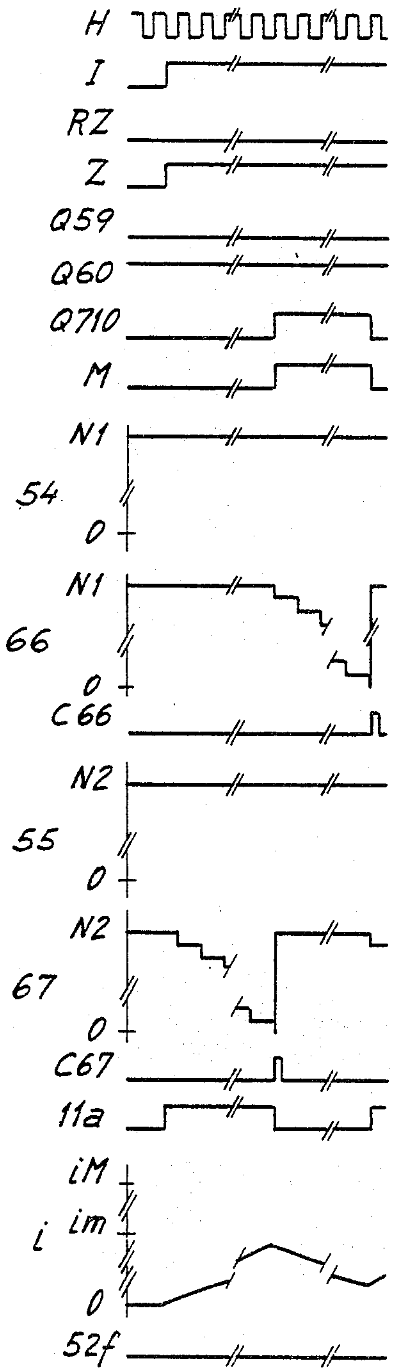
FIGS. 5*a* and 5*b* are diagrams representing signals which are measured at a number of points in the circuit shown in FIG. 5, in two modes of operation of the circuit.
Figure 5B:
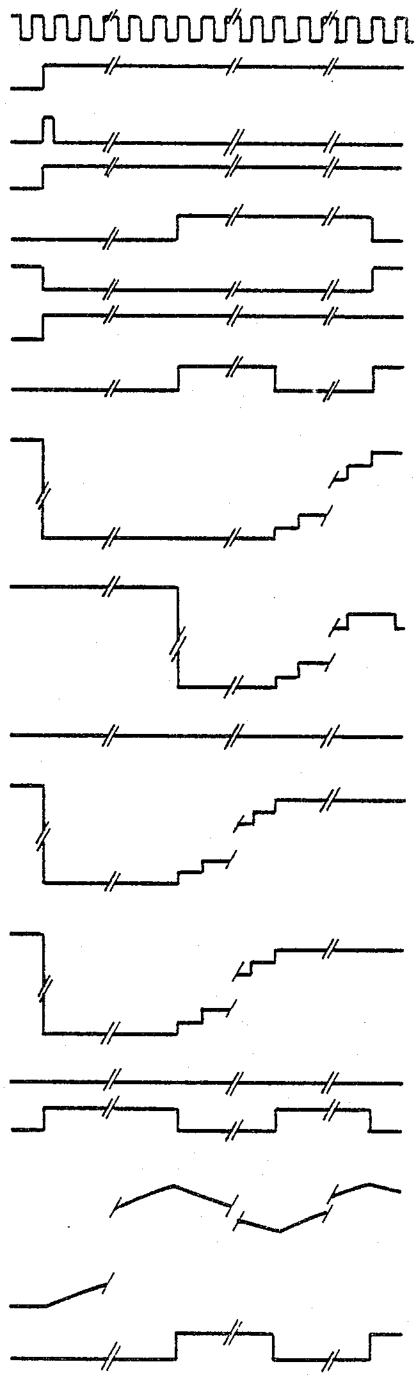

The mode of operation of the circuit shown in FIG. 5 will now be described in detail by reference to FIG. **5*a*, showing the case of a normal drive pulse, and FIG. 5*b***, showing the case of a drive pulse during which new values of T1m and T2m are measured and stored.

It will be shown below that, under normal operating conditions, the output Q of the flip-flop 59 is at state "0" and the output Q of the flip-flop 60 is at state "1". The signal X is therefore at state "1", the gate 50 (see FIG. 4) is in a conducting condition and the signal S permanently remains at zero voltage. On the other hand, the gates 56 and 57 are in a non-conducting condition and the inputs CL of the counters 54 and 55 are maintained at state "0". In addition, the output of the gate 71 is at state "1" and the output of the gate 69 which supplies the signal M assumes the same state as the output Q of the flip-flop 710.

It will also be shown below that the state of the outputs of the counter 54 corresponds to a number, expressed in binary coded form, designated by N1 in FIG. **5*a*, which is equal to the quotient of the time T1m defined above (FIG. 2), divided by the period of the signal H. Likewise, the state of the outputs of the counter 55 corresponds to a number, also expressed in binary coded form, which is designated by N2 in FIG. 5*a* and which is equal to the quotient of the time T2m defined above (see FIG. 2**), divided by the period of the signal H.

Between the drive pulses, the signal Z is at state 0. The gate 522 is therefore in a non-conducting condition and the clock inputs CL of the counters 66 and 67 are at state "0". The reset input R of the flip-flop 710 is at state "1" and the output Q of the flip-flop 710 is therefore at state "0".

During the drive pulses, the signal Z is at state "1". The input R of the flip-flop 710 is therefore at state 0 and the pulses of the signal H, which have a frequency of 32,768 Hz, are transmitted to the clock inputs CL of the counters 66 and 67.

When the output Q of the flip-flop 710 and therefore the signal M are at state "0", that is to say, during each of the elementary pulses forming the drive pulses, the preselection control input PE of the counter 66 is at state "1". The content N1 of the counter 54 is therefore imposed on the counter 66 which remains blocked in that state.

The preselection control input PE of the counter 67 on the other hand is at state "0" and the counter 67 counts down the pulses of the signal H from a condition corresponding to the content N2 of the counter 55, as will be shown hereinafter.

When the content of the counter 67 reaches the value of zero, the output C of the counter 67 produces a short pulse which is applied to the input T of the flip-flop 710 by way of the gate 73. The output Q of the flip-flop 710 goes to state "1" and the signal M therefore also goes to state "1".

The circuit 12 (see FIG. 4) interrupts the drive pulse which is present at that time in response to the state "1" of the signal M. In addition, the preselection control input PE of the counter 67 goes to state "1" and the content N2 of the counter 55 is transferred into the counter 67 which remains blocked in that condition. Finally, the preselection control input PE of the counter 66 goes to state "0" and the counter begins to count down the pulses of the signal H from the condition in which it is at that moment, that is to say, the condition corresponding to the content N1 of the counter 54.

When the content of the counter 66 reaches the value zero, the output C of the counter 66 produces a short pulse which is applied to the input T of the flip-flop 710. The output Q of the flip-flop 710 and the signal M go back to state "0" and the above-described procedure begins again, as long as the output of the timer 37 remains at state "0".

The period of time for which the signal M remains at state "0", that is to say, the duration T2 of each elementary pulse, is equal to the product of the period of the signal H by the number corresponding to the content of the counter 67 at the moment at which the signal M goes to state "0". As the number is equal to the number N2 corresponding to the content of the counter 55, the period of time T2 is equal to the above-defined period of time T2m. Similar reasoning shows that the period of time for which the signal M remains at state "1", that is to say, the length T1 of each period of interruption of the drive pulse, is equal to the above-defined period of time T1m.

When the output of the counter 372 goes to state "1", the output Q of the flip-flop 371 goes to state "1". The output Q goes back to state "0" about 15 microseconds later, in response to the signal H going to state "1". That pulse, which forms a periodic re-calibration signal indicated by RZ, sets the counters 54 and 55 to zero and switches the flip-flops 59 and 60 into the state in which their outputs Q are both at state "0". The gates 56, 57 and 522 are therefore non-conducting and the clock inputs CL of the counters 54, 55, 66 and 67 are maintained at state "0". On the other hand, the output Q of the flip-flop 710 is set to state "1". The outputs of the gates 70 and 71 are both at state "1" and the signal M which is present at the output of the gate 69 is therefore at state "0".

The signal Z also goes to state "1" at the moment at which the output of the counter 372 goes to state "1". As the signal M is at state "0", the drive circuit 12 connects the power supply source to the winding **11*a* (see FIG. 4). The transmission gate 50 (FIG. 4) being closed by the signal X which is at state "0", the current which begins to flow in the winding 11*a* also flows in the resistor 17. When that current reaches the value iM for the first time, the output 52*f* of the hysteresis circuit 52 and the output Q of the flip-flop 59 go to state "1". At the same time, the output of the gate 71 goes to state "0" and the signal M goes to state "1". The drive circuit 12 therefore interrupts the connection between the power supply source 10 and the winding 11*a*, and short-circuits the latter. The current flowing in the winding 11*a* and in the resistor 17** begins to fall.

At the same time, the gate 56 begins to transmit the pulses of the signal H, which are counted by the counter 54. After a period of time T1m which depends only on the electrical and magnetic characteristics of the motor, the current in the winding **11*a* reaches the value im. At that moment, the output 52*f* of the hysteresis circuit 52 goes to state "0". The gate 56 is therefore closed. The content of the counter 54** at that moment is equal to the product of the time T1m and the frequency of the signal H.

At the same time, the output of the gate 71 goes back to state "1" and the signal M goes back to state "0". The circuit 12 therefore reestablishes the connection between the winding **11*a* and the power supply source 10, and the current in the winding 11*a* begins to rise again. In addition, the gate 57 begins to transmit the pulses of the signal H, which are counted by the counter 55. At the same time, the preselection control input PE of the counter 66 goes to state "1" and the content of the counter 54 is transferred to the counter 66** which remains blocked in that condition.

After a time T2m which depends both on the electrical and magnetic characteristics of the winding **11*a* and the electromotive force V of the power supply source 10** and its internal resistance R*, the current in the winding **11*a* reaches the value iM for the second time. At that moment, the output 52*f* of the hysteresis circuit 52 goes back to state "1". The output Q of the flip-flop 59 therefore goes back to state "0" and the output Q of the flip-flop 60 goes to state "1". The gate 57 is closed by the state "0" at the output Q of the flip-flop 59. At that moment, the content of the counter 55** is equal to the product of the time T2m and the frequency of the signal H.

The output of the gate 71 is set to state 1 by the state "0" at the output $\overline{Q}$ of the flip-flop 60. From that moment, the signal M becomes dependent again on the state of the output Q of the flip-flop 710, which is at state "1" at that moment. The circuit 12 therefore interrupts the drive pulse.

The gates 56 and 57 are blocked by the state "0" at the output $\overline{Q}$ of the flip-flop 60. The gate 50 (see FIG. 4) on the other hand is switched into a conducting condition by the state "1" at the output Q of the flip-flop 60 and short-circuits the resistance 17. The signal S therefore also returns to zero.

With the output Q of the flip-flop 60 being at state "1", the gate 522 transmits the pulses of the signal H. Those pulses are counted down by the counter 66, the preselection control input PE of which is at state "0".

From that moment, the circuit shown in FIG. 5 operates as described hereinbefore. The signal M is alternately at states "1" and "0" for periods of time T1 and T2 which are respectively equal to the periods of time T1m and T2m measured in the above-described manner. As the period of time T2m depends directly on the voltage V of the power supply source 10 and/or its internal resistance R*, the drive pulse chopping duty cycle also depends on those parameters.

The circuit shown in FIG. 5 does therefore permit the above-described method to be performed.

It will be apparent that many modifications may be made in the circuit shown in FIG. 5 without thereby departing from the scope of the invention. For example, the frequency of the signal H which determines the degree of accuracy with which the periods of time T1m and T2m are measured could be selected to be of a different value. On the other hand, and still by way of example, the counter 372 could be omitted. The signal J would then be directly applied to the input T of the flip-flop 371. In that case, the chopping duty cycle would be determined at the beginning of each drive pulse.

We claim:

1. A method for controlling a stepping motor having a winding and a rotor which is magnetically coupled to said winding, from a power supply source having first and second characteristic parameters respectively comprising its electromotive force and its internal resistance, comprising producing drive pulses which are chopped at a given chopping duty cycle and which are formed by a series of elementary pulses separated by periods of interruption, each of said periods of interruption having a first stored duration and each of said elementary pulses having a second stored duration, applying said drive pulses to said winding, and modifying, at given times, said chopping duty cycle in dependence on the variation in at least one of said characteristic parameters.

2. The method of claim 1 wherein said chopping duty cycle is modified by connecting said source and said winding at each of said given times, measuring the current flowing in the winding, detecting a first time at which said current reaches a first predetermined value for the first time, disconnecting said source from said winding and putting the winding substantially in a short-circuited condition at said first time, detecting a second time at which said current reaches a second predetermined value, suppressing said short-circuited condition and re-connecting said source and said winding at said second time, detecting a third time at which said current again reaches said first predetermined value, measuring a first period of time which elapses between said first time and said second time, and a second period of time which elapses between said second time and said third time, and replacing said first stored duration by the value of said first period of time and said second stored duration by the value of said second period of time.

3. A device for controlling a stepping motor having a winding and a rotor which is magnetically coupled to said winding, comprising:

a power supply source having first and second characteristic parameters respectively comprising its electromotive force and its internal resistance;

first means for producing a control signal each time that the rotor is to rotate by one step;

second means for storing a chopping duty cycle;

third means for producing a chopping signal in response to said chopping duty cycle;

fourth means connected to said source to produce and apply to said winding a drive pulse which is chopped at said chopping duty cycle in response to said control signal and said chopping signal; and fifth means for modifying said chopping duty cycle in dependence on the variations in at least one of said characteristic parameters.

4. The device of claim 3 wherein:

said second means comprise means for storing first information relating to a first duration and means for storing second information relating to a second duration;

said third means are responsive to said first and second information to produce said chopping signal with alternately a first state during said first duration and a second state during said second duration;

said fourth means are responsive to said second state of the chopping signal to connect said source to said winding, and to said first state of the chopping signal to disconnect said source from said winding and to put said winding substantially in a short-circuited condition; and said fifth means comprise:

means for producing a measuring signal having a first state when the current flowing in said winding reaches a first predetermined value when rising and a second state when said current reaches a second predetermined value which is lower than said first predetermined value, when falling;

means for producing a re-calibration signal at least in response to a particular control signal;

means for putting said chopping signal successively in its second state in response to said re-calibration signal, in its first state at a first time which is the time at which said measuring signal assumes its first state for the first time and again in its second state at a second time which is the time at which said measuring signal assumes its second state;

means for producing a signal representing the first period of time which elapses between said first and second times;

means for producing a signal representing the second period of time which elapses between said second time and a third time which is the time at which said measuring signal assumes its first state for the second time;

said means for memorizing first information responding to said signal representing the first period of time to store information relating to said first period of time, and said means for storing second information responding to said signal representing the second period of time to store information relating to said second period of time.

* * * * *